US010445795B2

(12) United States Patent
Wiest et al.

(10) Patent No.: US 10,445,795 B2
(45) Date of Patent: Oct. 15, 2019

(54) SYSTEMS AND METHODS FOR MULTI-LEVEL BUSINESS PROCESSING

(75) Inventors: Robert Wiest, Zurich (CH); Motti Goldberg, Kilchberg (CH)

(73) Assignee: SWISS REINSURANCE COMPANY LTD., Zurich (CH)

( * ) Notice: Subject to any disclaimer, the term of this patent is extended or adjusted under 35 U.S.C. 154(b) by 2492 days.

(21) Appl. No.: 10/630,857

(22) Filed: Jul. 31, 2003

(65) Prior Publication Data
US 2005/0027546 A1 Feb. 3, 2005

(51) Int. Cl.
  G06Q 10/06 (2012.01)
  G06Q 30/06 (2012.01)
  G06Q 30/02 (2012.01)
  G06Q 50/18 (2012.01)
  G06Q 50/22 (2018.01)

(52) U.S. Cl.
  CPC ......... G06Q 30/06 (2013.01); G06Q 10/0633 (2013.01); G06Q 30/02 (2013.01); G06Q 30/0283 (2013.01); G06Q 50/188 (2013.01); G06Q 50/22 (2013.01)

(58) Field of Classification Search
  CPC .................................................. G06Q 10/0633
  USPC ..................... 705/1, 1.1, 300–301
  See application file for complete search history.

(56) References Cited

U.S. PATENT DOCUMENTS

| 5,191,522 | A | | 3/1993 | Bosco et al. |
| 5,573,244 | A | | 11/1996 | Mindes |
| 5,657,460 | A | | 8/1997 | Egan et al. |
| 5,704,029 | A | | 12/1997 | Wright, Jr. |
| 5,704,045 | A | | 12/1997 | King et al. |
| 5,732,397 | A | | 3/1998 | Detore et al. |
| 5,752,236 | A | | 5/1998 | Sexton et al. |
| 5,752,237 | A | | 5/1998 | Cherny |
| 5,754,980 | A | | 5/1998 | Anderson et al. |
| 5,758,126 | A | | 5/1998 | Daniels et al. |
| 5,774,887 | A | * | 6/1998 | Wolff et al. ............ 707/1 |
| 5,794,207 | A | * | 8/1998 | Walker et al. ............ 705/1 |
| 5,806,042 | A | | 9/1998 | Kelly et al. |
| 5,832,465 | A | | 11/1998 | Tom |
| 5,839,113 | A | | 11/1998 | Federau et al. |

(Continued)

FOREIGN PATENT DOCUMENTS

| CA | 2180995 | 1/1998 |
| EP | 0 918 424 | 5/1999 |

(Continued)

OTHER PUBLICATIONS

"New Industrial All Risks Policy to Cover Petrochem Projects too". Mayur Shetty, TNN Dec. 26 2001.*

(Continued)

Primary Examiner — Tiphany B Dickerson
(74) Attorney, Agent, or Firm — Oblon, McClelland, Maier & Neustadt, L.L.P.

(57) ABSTRACT

Systems and methods are disclosed for transacting business between a solicitor and a business. The system includes a server used by a business. The server is accessible by a solicitor. An evaluator is housed on the server. The evaluator receives input data by the solicitor and determines at a first stage whether the input data is complete to receive further evaluation, and at a second stage whether the input data as a whole falls within one or more specific pathways of further data evaluation.

18 Claims, 15 Drawing Sheets

(56) References Cited

U.S. PATENT DOCUMENTS

| | | | |
|---|---|---|---|
| 5,839,118 A * | 11/1998 | Ryan et al. ............... 705/36 R |
| 5,842,148 A | 11/1998 | Prendergast et al. |
| 5,842,921 A | 12/1998 | Mindes et al. |
| 5,852,808 A | 12/1998 | Cherny |
| 5,873,066 A | 2/1999 | Underwood et al. |
| 5,966,716 A | 10/1999 | Corner et al. |
| 5,978,769 A | 11/1999 | Brown et al. |
| 5,978,820 A | 11/1999 | Mase et al. |
| 5,983,268 A | 11/1999 | Freivald et al. |
| 5,991,733 A | 11/1999 | Aleia et al. |
| 6,023,685 A | 2/2000 | Brett et al. |
| 6,029,144 A * | 2/2000 | Barrett et al. ............. 705/30 |
| 6,049,772 A | 4/2000 | Payne et al. |
| 6,049,773 A | 4/2000 | McCormack et al. |
| 6,078,890 A * | 6/2000 | Mangin et al. ............ 705/2 |
| 6,084,585 A | 7/2000 | Kraft et al. |
| 6,137,488 A | 10/2000 | Kraft et al. |
| 6,141,653 A * | 10/2000 | Conklin ............. G06Q 30/06 705/1.1 |
| 6,321,212 B1 | 11/2001 | Lange |
| 6,332,125 B1 | 12/2001 | Callen et al. |
| 6,338,050 B1 * | 1/2002 | Conklin et al. ............. 705/80 |
| 6,343,272 B1 | 1/2002 | Payne et al. |
| 6,411,936 B1 | 6/2002 | Sanders |
| 6,411,939 B1 | 6/2002 | Parsons |
| 6,460,021 B1 | 10/2002 | Kirksey |
| 6,510,418 B1 * | 1/2003 | Case et al. .............. 705/26 |
| 6,526,386 B1 | 2/2003 | Chapman et al. |
| 6,594,635 B1 | 7/2003 | Erlanger |
| 6,604,080 B1 | 8/2003 | Kern |
| 7,277,861 B1 * | 10/2007 | Benson et al. ............. 705/4 |
| 7,359,863 B1 * | 4/2008 | Evenshaug et al. ......... 705/4 |
| 2001/0027437 A1 | 10/2001 | Turbeville et al. |
| 2001/0028364 A1 | 10/2001 | Fredell et al. |
| 2001/0037274 A1 | 11/2001 | Monticciolo |
| 2001/0044734 A1 | 11/2001 | Walker et al. |
| 2001/0047325 A1 | 11/2001 | Livingston |
| 2001/0053986 A1 | 12/2001 | Dick |
| 2002/0002475 A1 | 1/2002 | Freedman et al. |
| 2002/0004731 A1 | 1/2002 | Belben |
| 2002/0029158 A1 | 3/2002 | Wolff et al. |
| 2002/0032586 A1 | 3/2002 | Joao |
| 2002/0032646 A1 | 3/2002 | Sweeney et al. |
| 2002/0035489 A1 | 3/2002 | Herman et al. |
| 2002/0035528 A1 | 3/2002 | Simpson et al. |
| 2002/0042770 A1 | 4/2002 | Slyke et al. |
| 2002/0046066 A1 | 4/2002 | Laurenzano |
| 2002/0046067 A1 | 4/2002 | Kruchenbuchl et al. |
| 2002/0046169 A1 * | 4/2002 | Keresman, III ...... G06Q 20/04 705/41 |
| 2002/0049617 A1 | 4/2002 | Lencki et al. |
| 2002/0055862 A1 * | 5/2002 | Jinks ..................... 705/4 |
| 2002/0069077 A1 | 6/2002 | Brophy et al. |
| 2002/0069155 A1 | 6/2002 | Nafeh et al. |
| 2002/0077866 A1 | 6/2002 | Javerlhac |
| 2002/0077868 A1 | 6/2002 | Javerlhac |
| 2002/0078046 A1 | 6/2002 | Uluakar et al. |
| 2002/0082874 A1 | 6/2002 | Go |
| 2002/0082875 A1 | 6/2002 | Best-Devereux |
| 2002/0091553 A1 | 7/2002 | Callen et al. |
| 2002/0091624 A1 | 7/2002 | Glodjo et al. |
| 2002/0091991 A1 | 7/2002 | Castro |
| 2002/0095317 A1 | 7/2002 | McCabe |
| 2002/0099640 A1 | 7/2002 | Lange |
| 2002/0111833 A1 | 8/2002 | Dick |
| 2002/0116227 A1 | 8/2002 | Dick |
| 2002/0120776 A1 | 8/2002 | Eggebraaten et al. |
| 2002/0138307 A1 | 9/2002 | Kramer |
| 2002/0143583 A1 | 10/2002 | Reader et al. |
| 2002/0143584 A1 | 10/2002 | Lundegren |
| 2002/0147670 A1 | 10/2002 | Lange |
| 2002/0152098 A1 | 10/2002 | Evans et al. |
| 2002/0156656 A1 | 10/2002 | Harrell et al. |
| 2002/0156658 A1 | 10/2002 | Selesny et al. |
| 2002/0156709 A1 | 10/2002 | Andrus et al. |
| 2002/0156719 A1 * | 10/2002 | Finebaum et al. ............. 705/37 |
| 2002/0169715 A1 | 11/2002 | Ruth et al. |
| 2002/0174042 A1 | 11/2002 | Arena et al. |
| 2002/0174046 A1 | 11/2002 | Mistretta |
| 2002/0188540 A1 | 12/2002 | Fay et al. |
| 2002/0194053 A1 | 12/2002 | Barrett et al. |
| 2002/0194098 A1 | 12/2002 | Stiff et al. |
| 2002/0194131 A1 | 12/2002 | Dick |
| 2002/0198802 A1 | 12/2002 | Koresko, V |
| 2003/0004759 A1 | 1/2003 | Chapman et al. |
| 2003/0009355 A1 | 1/2003 | Gupta |
| 2003/0009359 A1 | 1/2003 | Weidner et al. |
| 2003/0014342 A1 | 1/2003 | Vande Pol |
| 2003/0018497 A1 | 1/2003 | Luedtke |
| 2003/0018576 A1 | 1/2003 | Zuckerbrot et al. |
| 2003/0023544 A1 | 1/2003 | Chodes |
| 2003/0028405 A1 | 2/2003 | Chapman et al. |
| 2003/0028479 A1 | 2/2003 | Kirksey |
| 2003/0033240 A1 * | 2/2003 | Balson et al. ............. 705/37 |
| 2003/0046115 A1 | 3/2003 | Hisano |
| 2003/0055778 A1 | 3/2003 | Erlanger |
| 2003/0061075 A1 | 3/2003 | Heckman et al. |
| 2003/0065540 A1 | 4/2003 | Callen et al. |
| 2003/0074233 A1 | 4/2003 | Lee |
| 2003/0074235 A1 | 4/2003 | Gregory |
| 2003/0078815 A1 | 4/2003 | Parsons |
| 2003/0078816 A1 | 4/2003 | Filep |
| 2003/0083908 A1 | 5/2003 | Steinmann |
| 2003/0083972 A1 | 5/2003 | Williams |
| 2003/0083975 A1 | 5/2003 | O'Grady et al. |
| 2003/0088430 A1 | 5/2003 | Ruark |
| 2003/0110061 A1 * | 6/2003 | Lakenbach et al. ............. 705/4 |
| 2003/0115128 A1 | 6/2003 | Lange et al. |
| 2003/0125108 A1 | 7/2003 | Groz |
| 2003/0126155 A1 | 7/2003 | Parker et al. |
| 2003/0130920 A1 | 7/2003 | Freund |
| 2003/0135395 A1 | 7/2003 | Carfi et al. |
| 2003/0144888 A1 | 7/2003 | Baron et al. |
| 2003/0154094 A1 | 8/2003 | Bredemeier et al. |
| 2003/0167220 A1 | 9/2003 | Schoen et al. |
| 2003/0195776 A1 | 10/2003 | Moore et al. |

FOREIGN PATENT DOCUMENTS

| | | |
|---|---|---|
| EP | 0 955 595 | 11/1999 |
| EP | 1 115 075 | 11/2001 |
| WO | WO 00/54203 | 9/2000 |

OTHER PUBLICATIONS

"ICC the World of Technology in Forensics Investigation". Dec. 4, 2002 accessed via www.archive.org (www.insuranceclaimsconsultants.com).*
Canadian Examiner's Report, dated May 21, 2003.
Canadian Examiner's Report, dated Feb. 18, 2004.
Jean Cora, "What's New in Cybertalk?," Cybertalk (Oct. 2000), http://www.loma.org/cyboct00.asp.
"The Insurance Industry: The eCommerce Imperative Summary Report," Deloitte & Touche LLP (Jan. 2000); http://www.dttgfsl.com/publications/pdf_files/Insurance.ecommerce.pdf.
U.S. Appl. No. 11/048,764, filed Feb. 3, 2005.
"Questions of reinsurance. A short guide," produced by Swiss Re Publishing (1998), Swiss Reinsurance Company, Mythenqual 50/60, PO Box CH-8022 Zurich, Switzerland.
"Overview of Riskclick," http://www.riskclick.com.
"Reinsurance for the Third Milennium," http://marketing.rl3k.com.
"Inreon," http://www.Inreon.com.
"Smartfac," http://www.smartfac.com.
"Platform—eReinsure," http://www.ereinsure.com.
"Insurance and Reinsurance Industry Business Methods and Software Intellectual Property Prior Art," Dec. 2001 (Lincoln National Reassurance Company).
"ManageReinsurance User Guide," version 1.1 (Dec. 5, 2001).
R. Grunig and P. Hall, "An introduction to rating casualty business," Swiss Reinsurance Company, Zurich (2000).

(56) References Cited

OTHER PUBLICATIONS

"An introduction to reinsurance," Swiss Reinsurance Company (1996).
U.S. Appl. No. 09/967,045, filed Oct. 1, 2001.
U.S. Appl. No. 10/267,942, filed Oct. 10, 2002.
U.S. Appl. No. 10/660,644, filed Sep. 12, 2003.
U.S. Appl. No. 10/718,615, filed Nov. 24, 2003.

* cited by examiner

My SwiftRe   Placements

PLACEMENT DETAILS: Facultative Risk                                    Status: Draft Client Name

Business and Reinsurance Type
Territorial Scope:              Territorial Scope              Line of Business:    Property
Reinsurance Type:               Facultative Proportional

General Risk Information
* - Mandatory input

Reinsured:
Reinsured

Name of Risk:*                                                 Comment:

EU -

Original Policy/Reference Number:*                             ZIP/Postal Code:*   Location:*
prepopulated previous page Main Industry Code/Occupancy:*                                 Currency:*
[Select...]                                                    [prepopulate territorial scope]

Sub-Category:*
[Select...]

Reinsurance Details (100% figures originally insured)
Inception of            Expiration of                                              Perils covered:*
Reinsurance Cover:*     Reinsurance Cover:*                                        [Fire & Extended Coverage ▼]
[dd/mm/yyyy]            [dd/mm/yyyy]

MPL in % of      Indemnity
                        Sum Insured:*          Deductible:*                        Premium          Sum Insured:*    Period:*
                                                                                   Rate%:                            n/a
Building/Contents/
Machinery/Stock                                            amt                                                       [...] months Loss of Profits                                            days Total Sum Insured:

In case of multiple locations,
Num. Locations:*        Sum Insured of Top Location:

My SwiftRe   Placements

PLACEMENT DETAILS: Facultative Risk
Client Name                                                                 Status: Draft Basic Information    Extended Information ⚠ Warnings found: Move your cursor over the ⚠ below to see the detailed warning message(s). If you submit Placement anyway this will go to Manual Processing

Business and Reinsurance Type
Territorial Scope:         Territorial Scope         Line of Business:         Property
Reinsurance Type:          Facultative Proportional
General Risk Information
*.. Mandatory Input*

Reinsured:
Reinsured
Name of Risk:*                                                   Comment:

Original Policy/Reference Number:*
prepopulated previous page                                       ZIP/Postal Code:*   Location:*
Main Industry Code/Occupancy:*                                   Currency:*
Select...                                          EUR -         prepopulate territorial scope
Sub-Category:*
Select...
Reinsurance Details (100% figures originally insured)
Inception of         Expiration of
Reinsurance Cover:*  Reinsurance Cover:*
dd/mm/yyyy           dd/mm/yyyy                                  Perils covered:*
                                                                 Fire & Extended Coverage Sum Insured:*        Deductible:                  MPL in %     Indemnity
Building/Contents/                                              Premium Rate: of Sum Insured:* Period:*
Machinery/Stock                          amt                                        n/a
Loss of Profits                          days                                       [  ] months
Total Sum Insured:

Num. Locations:*     In case of multiple locations,
                     Sum Insured of Top Location:

Figure 8

*My SwiftRe* Placements

PLACEMENT DETAILS: Facultative Risk

Client Name                                                    Status: Draft

| Basic Information | Extended Information |

Additional Information

Non-Standard Risk Information
A. Survey Report/Risk Information:
   ## File Name ##    [Remove] [Browse...] [Add]

B. Loss History
   ## File Name ##    [Remove] [Browse...] [Add]

C. Insurance Conditions/Wordings
   ## File Name ##    [Remove] [Browse...] [Add]

D. Reinsurance Conditions:
   ## File Name ##    [Remove] [Browse...] [Add]

E. Others:
   ## File Name ##    [Remove] [Browse...] [Add]

Message:

900

[Go Back] [Save as Draft] [Continue]

SYSTEMS AND METHODS FOR MULTI-LEVEL BUSINESS PROCESSING

BACKGROUND

Field of the Invention

The present invention relates to systems and methods for multi-level business processing. More particularly, the present invention relates to automated systems and methods for receiving information associated with business offers, evaluating the information, and responding to the business offers.

Background of the Invention

A business may receive numerous solicitations from another party, such as another business, in order to form contracts, such as business-to-business ("B2B") contracts. Whenever such a solicitation is received from an offering business, the receiving business must typically then consider the solicitation and the specific terms of the contract to ascertain whether such a contract would be beneficial for the receiving business. Consideration of such soliciting offers is both time consuming and costly, partly because representatives of the receiving business have to spend time considering such solicitation contracts. Furthermore, if the receiving business receives a large quantity of such solicitation contracts, there is no efficient way to consider all of the contract offers in a timely manner other than to have a number of personnel consider all such contracts. Finally, the soliciting business may renege on the solicitation offer if a considerable time period elapses before the receiving party reacts to the contract. This time delay and requirement for live personnel decreases efficiency and increases costs associated with B2B contracts.

An example of a business that routinely receives solicitation offers is a reinsurance company. Such a company typically receives a number of solicitation offers from other businesses, which are usually insurance companies. Such offers relate to various general or specific matters for which the insurance companies desire the services of the reinsurance company. Because of the potentially high number of such solicitation offers and the large number of volatile variables that are involved within each offer, time is of the essence in considering and replying to such solicitation offers. Any lapse of time between when a solicitation offer is made by an insurance company and a decision is rendered by the reinsurance company may result in a revocation of the offer or a change in status of a variable in the offer that significantly affects the offer. Thus, it is to the advantage of the both the insurance company and the reinsurance company to consider any potential B2B contracts in a rapid manner while minimizing the costs of such consideration.

SUMMARY OF THE INVENTION

The present invention, as described in the exemplary embodiments presented herein, addresses the shortcomings of the efficiencies and inaccuracies that typically occur between two or more parties in developing a business contract. Such parties may include individuals, businesses, agencies or governments. The examples presented throughout this disclosure are directed to interactions between a reinsurance company and its typical customer, an insurance company. However, this example is merely presented for simplicity and is not intended to be limiting of the present invention.

In one exemplary embodiment of the present invention, a system is disclosed for transacting business between a solicitor and a business. The system includes a server used by a business. The server is accessible by a solicitor. A contract evaluator is housed on the server. As used herein, the term "server" can include a network of servers. The contract evaluator receives input data by the solicitor and determines at a first stage whether the input data is complete to receive further evaluation, and at a second stage whether the input data as a whole falls within one or more specific pathways of further data evaluation.

In another exemplary embodiment of the present invention, a system is disclosed for transacting business between a solicitor and a business. The system includes a server used by a business. The server is accessible by a solicitor. The system further includes means for contract evaluation housed on the server. The means for evaluation receives input data by the solicitor and determines at a first stage whether the input data is complete to receive further evaluation, and at a second stage whether the input data as a whole falls within one or more specific pathways of further data evaluation.

In yet another exemplary embodiment of the present invention, a method is disclosed for transacting business between a solicitor and a business. The method includes accessing a server by a solicitor. The server is used by the business. The method further includes evaluating data that is input by the solicitor and determining at a first stage whether the input data is complete to receive further evaluation, and at a second stage whether the input data as a whole falls within one or more specific pathways of further data evaluation.

BRIEF DESCRIPTION OF THE DRAWINGS

FIGS. 6, 7, 8, 9, 10, and 11 are exemplary screenshots that can be used in the exemplary processes and systems described in FIGS. 1-5 above.

FIGS. 12 and 13 show two portions of an exemplary screenshot that shows an exemplary manual counteroffer that can be provided by a system of the invention.

DETAILED DESCRIPTION OF PREFERRED EMBODIMENTS

The systems and methods according to the present invention utilize a universal interface between a solicitor or customer and a business to facilitate potential business opportunities between two or more parties. The exemplary systems and methods presented herein decrease the time and labor associated with conventional offer-acceptance contract preparation, resulting in decreased costs and increased efficiency in transactions between an offeror (typically the solicitor) and an offeree (typically the business).

Although exemplary embodiments described herein are made with reference to the reinsurance industry as an example, the invention is not limited to this type of business. Other types of businesses would benefit from the exemplary systems and methods described herein, and with some known adaptations or configurations to conform to the particular business. For example, any type of organization that may potentially receive a large number of solicitation offers for creating a contract may benefit from the systems and methods described herein, with expected modifications, apparent to one having skill in the art, to conform to the specific organization.

Figure 1:
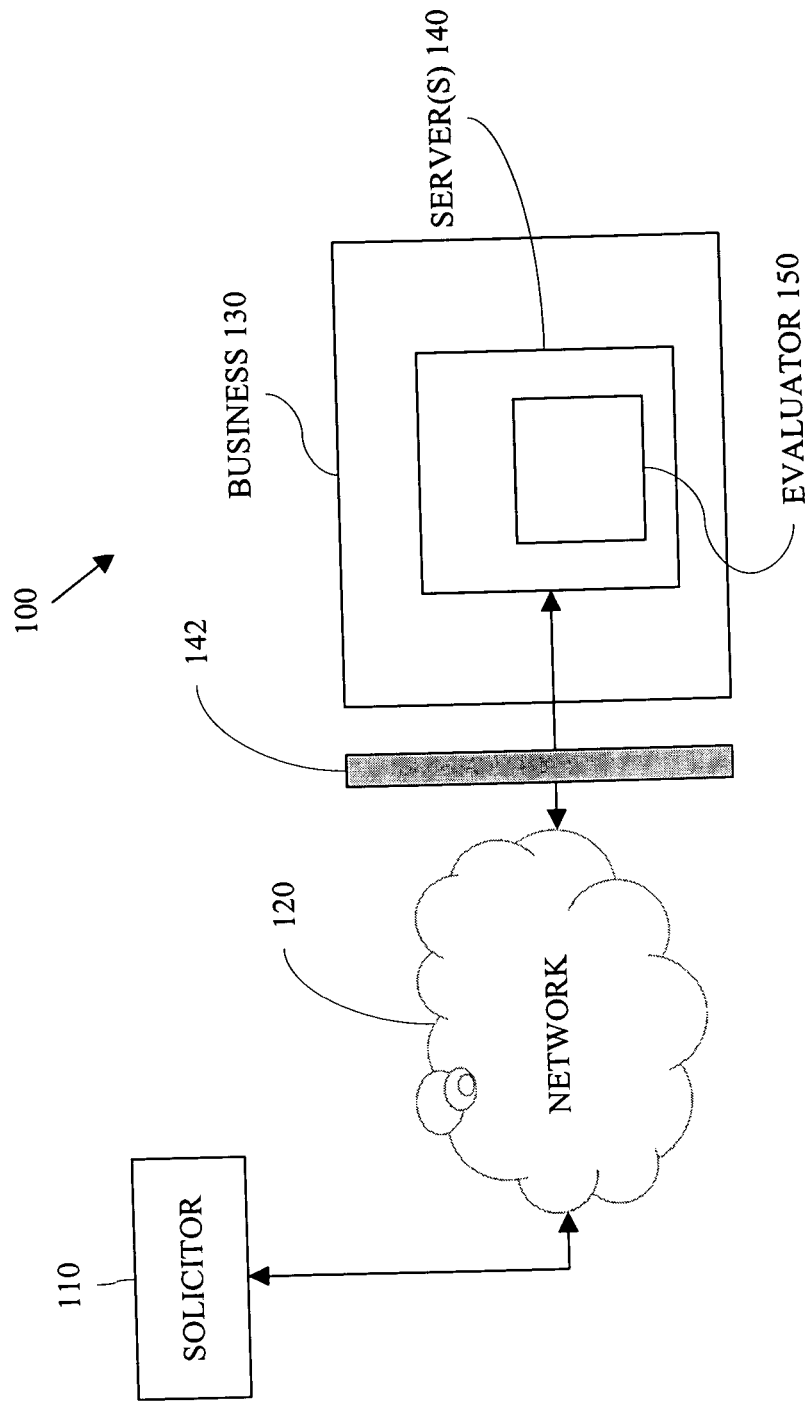
FIG. 1 is a schematic diagram showing an exemplary system of the invention.

FIG. 1 is a schematic diagram showing an exemplary system of the invention. System 100 of the invention includes server 140 and evaluator 150. Server 140 can include one server or a network of servers. Server 140 is associated with business 130. For example, server 140 can be owned, operated, or otherwise maintained by or on behalf of business 130. Server 140 is associated with evaluator 150. Evaluator 150 is associated with a processor that is configured to execute processes and methods in accordance with the present invention as described herein.

Server 140 is accessible to one or more solicitors 110 over network 120. Firewall 142 of server 140 is provided to prevent unauthorized access to server 140. The use of firewall 142 is well known in the art and it is therefore not described in detail herein.

Solicitor 110 and business 130 can communicate with each other via network 120. Network 120 can be any known communications network. Preferably, Network 120 is the Internet. In the context of the reinsurance industry, solicitor 110 is an insurance company that sells insurance policies to insured parties. Business 130 is a reinsurer that deals with solicitor 110 in provision of reinsurance services associated with the insurance policies of solicitor 110.

For example, when solicitor 110 (e.g., an insurance company) provides business 130 with a request of offer that includes input data, the input data flows through application modules associated with server 140. For convenience, the process associated with the applications modules is hereinafter referred to as the "triage" process.

The request is first validated technically to ensure that the input data provided by solicitor 110 fits the minimum data quality requirements. The data quality requirements can include, for example, correct syntax, each value of the input data is within a predefined (context-less) range, basic relationships between values in the request are correct (e.g., DATE1 is before DATE2); and so on.

Next, modules/functions associated with server 140 can concentrate on business validation rules. The business validation rules can include a multi-stage or multi-pass process. For example, a first triage-pass can be performed based on fully automated rules. At the minimum, the first triage-pass provides the knowledge to further route the request to either an automated path or to a path that involves intervention by a user associated with business 130. A more sophisticated first triage-pass can provide much more functionalities. For example, a more advanced first triage-pass can select one out of several paths. The paths can be either automatic or manual.

The more advanced first triage-pass can also check against various plausibility rules, policy rules, and system-data rules. The more advanced first triage-pass can further return to solicitor 110 indicating that some values (or relationships) need to be confirmed. The more advanced first triage-pass can even request additional information from solicitor 110 based on newly categorization of the request. Thus, the evaluation of the requests against the rules are done before the user associated with business 130 is even aware of the request taking place, while ensuring that solicitor 110 is not asked to provide unnecessary information.

Then, if the request is deemed complex enough to warrant human intervention, the request is forwarded to the user associated business 130 who can apply non-automated decisions. For example, a second triage-pass or even a third or fourth triage-passes can be used to further process the request. It is noted that the whole triage process can be nested, i.e., a new triage pattern may be triggered at any step along the process.

Figure 2:
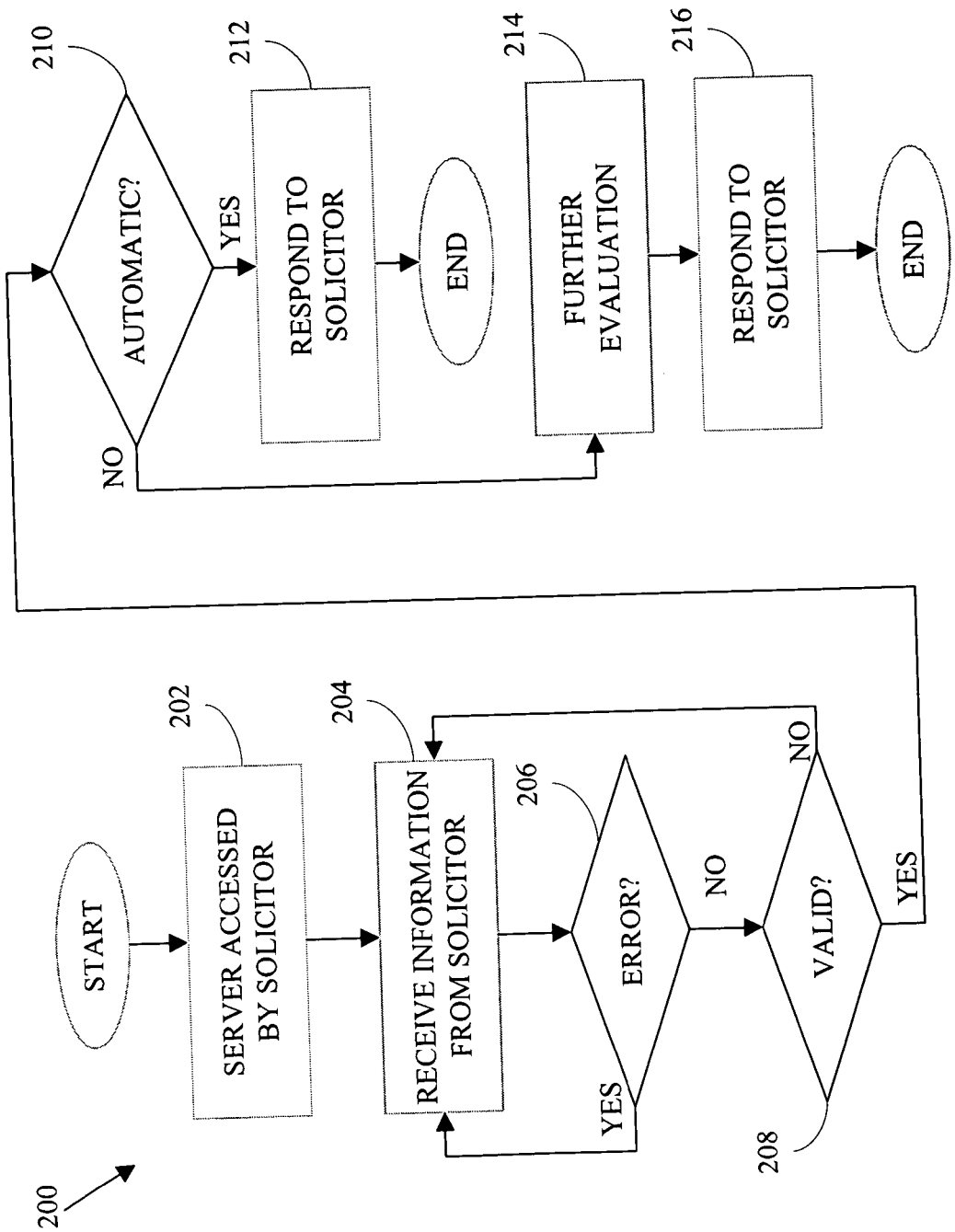
FIG. 2 is a flowchart showing an exemplary process in accordance with a preferred embodiment of the invention.

FIG. 2 is a flowchart showing an exemplary process in accordance with a preferred embodiment of the invention. Exemplary process 200 depicted in FIG. 2 includes steps 202 through 216. It is noted, however, other embodiments of the invention can include fewer steps or more steps than those depicted in FIG. 2.

In step 202, solicitor 110 accesses server 140 associated with business 130. As described above, access can be performed via a number of known methods, including via network 120. As noted above, server 140 is preferably protected by firewall 142. Network 120 is preferably the Internet. Other networks may be used. For example, a virtual private network (VPN) or the like may be used in lieu of the Internet. One purpose for solicitor 110 to access server 140 is to make a business offer to business 130. Another purpose may be for solicitor 110 to request a payment from business 130. Still another purpose may be for business 130 to make an offer to solicitor 110. Therefore, the solicitation can be initiated by either party.

In step 204, evaluator 150 receives information from solicitor 110. The information can be, for example, input data associated with a business offer. In this step, a number of methods may be used. For example, solicitor 110 can download to server 140 a file that contains the input data associated with the business offer. Preferably, however, a user interface associated with server 140 and evaluator 150 is used by solicitor 110 to provide the input data. Preferably, the user interface is interactive. Preferably, the user interface includes a voice recognition module.

In step 206, evaluator 150 reviews the input data. If the input data contains errors, process 200 returns to step 204. Otherwise, process 200 goes to step 208. The errors can be technical in nature. For example, there may be typographically errors associated with the input data. Other technical errors may include, for example, a subsequent date of a chain of events is erroneously input by solicitor 110 to be earlier than an initial date of the chain of events. Other rules that can be used to detect these errors can include the use of a maximum value associated with each input data field so that if the input data field is populated with a value that exceeds the maximum value, an error is detected. It is noted that step 206 is fully automated, e.g., no human intervention is involved. It is further noted that server 140 and evaluator 150 can accommodate a large number of rules. For example, in an exemplary implementation of the invention in the reinsurance business, about 500 to 1,000 rules can be considered by evaluator 150 in step 206.

In step 208, if no errors were detected in step 206, or all errors previously detected have been corrected, process 200 determines whether the input data is valid. A validity determination in step 208 queries whether it makes business sense for business 130 to accept the offer provided by solicitor 110. For example, even though the business offer input by solicitor 110 contains no technical error in the input data, evaluator 150 determines whether there is any business value for business 130 to accept the offer from solicitor 110. If the input data is valid, as determined by evaluator 150 in step 208, process 200 goes to step 210. Otherwise, process 200 ends, and the business offer is effectively rejected. Preferably, however, process 200 can optionally return to step 204 so that solicitor 110 is given another opportunity to provide additional information tending to make a business case so that business 130 would accept the offer. In that case, steps 206 and 208 are repeated after server 140 receives the additional information from solicitor 110 in step 204.

In step 210, evaluator 210 determines whether a validated request (i.e., after step 208) from solicitor 110 can be responded fully automatically (e.g., without human intervention on behalf of business 130). If so, process 200 goes to step 212. Otherwise, process 200 goes to step 214. In an exemplary step 210, as an example and not a limitation, if the total liability in monetary terms associated with the business offer from solicitor 110 is below a predetermined threshold, process 200 can go to step 212. On the other hand, if the liability exceeds the predetermined threshold, process 200 can go to step 214.

In step 212, evaluator 150 responds to solicitor 110. Here, for example, evaluator 150 can accept an offer, decline an offer, or propose a counteroffer without human intervention.

In step 214, further evaluation is made by business 130. Here, human intervention can be involved. For example, a user of business 130 such as a contract administrator can review the input data associated with the business offer and make a determination regarding how the offer received from solicitor 110 should be responded to.

In step 216, based on a decision received from the contract administrator of business 130, server 140 responds to solicitor 110. The response can include one of an acceptance of the offer, a rejection of the offer, a counteroffer to the offer, or another response.

Figure 3:
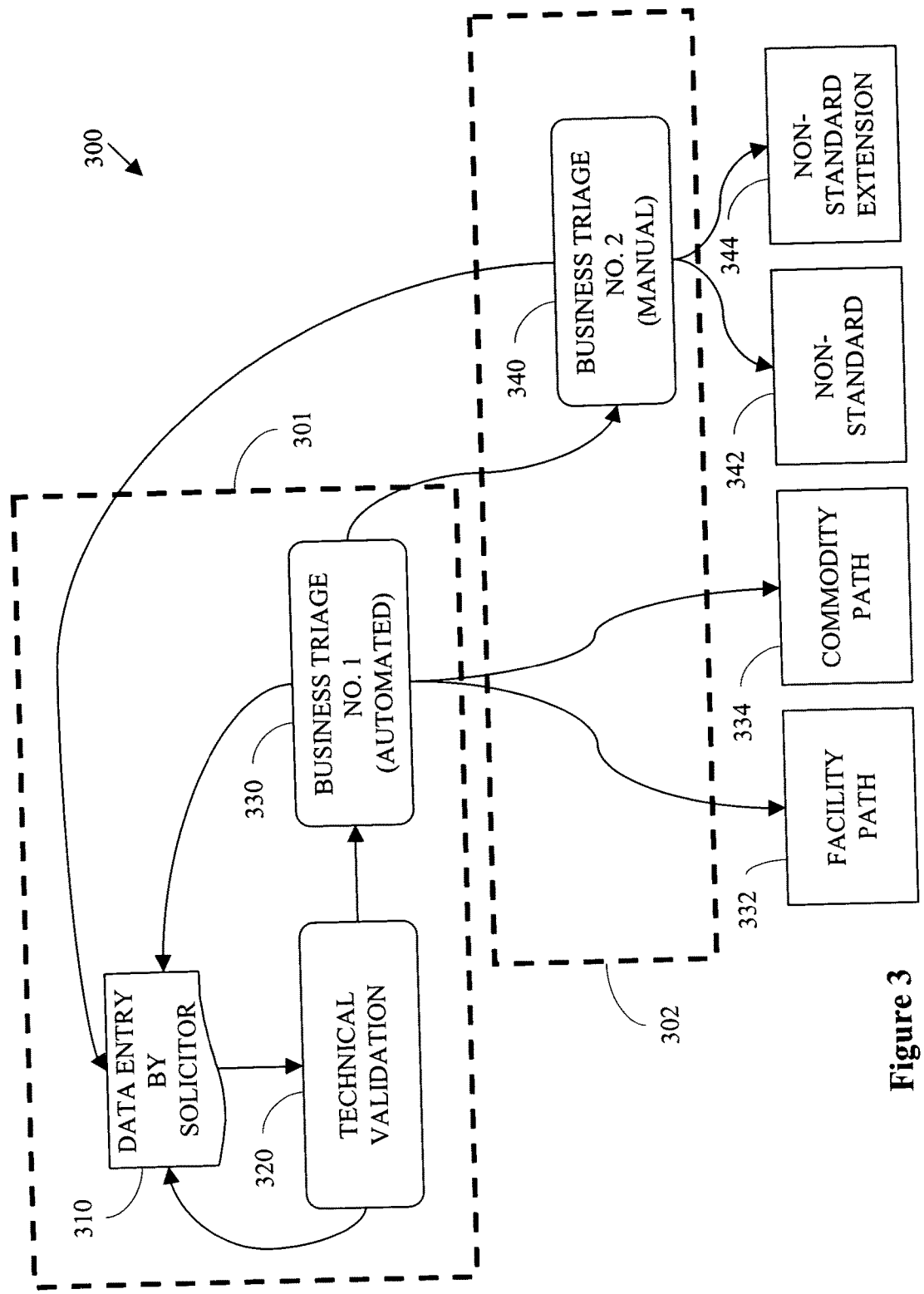
FIG. 3 is a flow diagram showing an exemplary process of the invention as implemented in the reinsurance business context.

FIG. 3 is a flow diagram showing an exemplary process of the invention as implemented in the reinsurance business context. In this context, solicitor 110 is an insurance company and business 130 is a reinsurance company. Preferably, there is a pre-existing relationship between solicitor 110 and business 130. For example, a treaty or another contractual relationship is already in place between solicitor 110 and business 130. Process 300 includes two user-system interaction instances. First user-system interaction instance includes processes enclosed by environment 301. Part of the second user-system interaction instance includes processes enclosed by environment 302.

Exemplary process 300 can be implemented as a multi-level business process for the reinsurance business. In data entry stage 310, data is captured, typically from input of solicitor 110 (e.g., using a browser via network 120). Note that data may also be captured via an API or data-storage medium. However, in such cases, no "intelligence" is present on the requestor side, and the interaction that is possible is relatively limited when dealing with "normal" systems.

Preferably, significant information relates to the details of the proposed contract offer is provided by solicitor 110 in stage 310. The information preferably includes, for example, one or more of a name of solicitor 110, a reference number associated with the treaty between solicitor 110 and business 130, a description of the subject matter of the offer, an amount of the insurance policy associated with the offer, a term (e.g., duration) of the insurance policy, and the like.

After stage 310 is completed, process 300 involves stage 320. Stage 320 is a technical validation stage. In stage 320, data associated with the offer is validated. If an error is found, process 300 returns from stage 320 to stage 310. In an exemplary implementation of the invention, validation rules associated with stage 320 can be defined in three validation levels: (1) syntax and format; (2) context-less range of value; and (3) context of data in relationship to other values within the request.

These three validation levels fit two interesting practical properties. First, the validation levels can be checked at the UI (user interface) or top level, thus providing better usability. Second, the validation levels can be used as integrity rules at the DBMS (database management system) or bottom level, thus enabling savings without compromising or complicating the DBMS design. The DBMS enables users to perform different operations on data. For example, data can be retrieved, appended, edited, updated. In addition, the DBMS enables reports to be generated. Once validated, the next processes can perform clearer and much more efficient business-level validations!

Input data provided by solicitor 110 is then considered within an automated triage process of the invention. Two or more passes or phases (stages 330 and 340) are present within an exemplary triage system of the invention. For example, it would be beneficial for any potential solicitation offer to be quickly considered by the triage system, as an initial step for any submission to the reinsurance company. The triage system performs in the same manner without regard to the content of the data being submitted. After evaluation of the data that has been submitted to the triage system, the automated system then determines which process is chosen for this specific submission.

An exemplary triage system of the invention may be workflow-based (e.g., process-oriented) so that it offers various complexities within the workflow-design. Thus, it has a selection mechanism in place, which selects the most appropriate workflow. In this way, the triage system promotes an efficient but still adequate processing of a submission. For example, every time a triage results in the involvement of a new person and/or role, that is a workflow. The workflow involves, for example, the decision of who should do what as next step (based on existing rules and data, and the outcome of previous step or steps) and the forwarding of such a request for action to that person/system.

At stage 330, the first pass, the triage system checks the new data against various sets of automated rules. In an implementation in the reinsurance business, several categories/dimensions for such rules have been identified.

The first set of rules is known as Plausibility rules. One example of the Plausibility rules is twelve-month coverage for Fac Property (Facultative Property) in Europe or lower or higher than expected premium payment in back office premium payment process.

The second set of rules is know as Global and Local rules. One example of the Global and Local rules is that Petrochemical placements (G) must go through a special evaluation. Another example of the Global and Local rules is that placement with TSI (Total Sum Insured) greater than SFr. 300M must be double-approved in Germany (L). Another example of the Global and Local rules involves reinsurer related rules (e.g., the client has had too many claims and needs to be audited, or "name clearing").

The third set of rules is know as Application rules, which can be used when the rating engine for TPL (Third Party Liability) is not advanced enough to enable automatic rating.

Each of these rules can be designated as Silent, Vocal, or Extension. Silent means that no feedback is given to the user. However, later or subsequent processes may be affected (e.g., when all BUCs (Business Use Cases) in a specific market behave differently from the default behavior). Vocal means that the user is informed, i.e., process 300 returns from business triage stage 330 to data entry stage 310. For example, the Plausibility rules can be used to ask the user whether an interpretation by the triage system was really the meaning intended by the user. Extension are Vocal rules that imply that additional information is needed (i.e., process 300 returns from stage 340 to stage 310), before the next step (from stage 340 to stage 344) is performed.

Note that up to stage 330 no human expertise has been involved in process 300; and yet, at stage 330, the data provided is accurate, and the data reflects the wish of solicitor 110. The data, or at least the majority of the data, contains sufficient information required to complete the business transaction.

For example, at stage 330 it may be asserted whether a new placement fits into a facility agreement (process 300 goes from stage 330 to facility path 332), or is a simple commodity risk (process' 300 goes from stage 330 to commodity path 334), or requires an underwriter (U/W)'s intervention (from stage 330 to stage 340). And, if the underwriter's intervention is required and or additional data is needed, this data has also already been provided (during the loop from stage 330 stage 310).

Note also that this triage pattern allows business 130 to define data-capturing forms adapted or configured to its specific needs. For example, whether the data is required for this particular instance (e.g., claims history for placement or images for claims) or whether the data is asked for this particular instance. If additional data is needed, the data can be defined as mandatory.

When required, manual intervention (e.g., from stage 340 to non-standard intervention 342 and from stage 340 to non-standard extension intervention 344) can be used for further triage of processing paths (e.g., voluntary escalation, decision on which rating tool to use, and so on). Additional information may be requested from solicitor 110 also at this step (e.g., from stage 340 to stage 310), although it typically comes in an unstructured way (e.g., files, chat etc.), which is not on-line or an immediate response.

Figure 4:
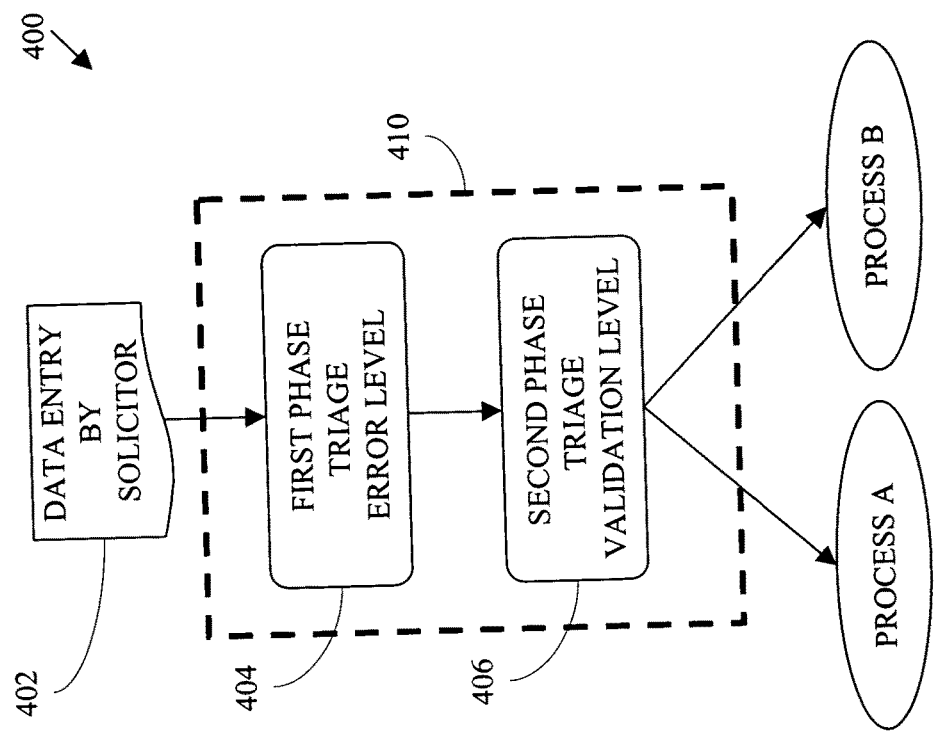
FIG. 4 shows a different embodiment of a triage system of the invention that may be configured or adapted for use in the reinsurance business or another business.

FIG. 4 shows a different embodiment of a triage system of the invention that may be configured or adapted for use in the reinsurance business or another business. System 400 shown in FIG. 4 is a two-level system.

Following data entry in step 402, at first phase triage error level 404 of triage process 410, basic and clear errors are considered within the input data. Such errors can include, but are not limited to, obvious errors in calculations or omissions of necessary and important contract details. For example, system 400 can generate a stage one error when percentage calculations result in a total greater than 100%. There are several types of such errors include, for example, omission of required data (e.g., Name of Risk), wrong values (e.g., %>100), wrong format (e.g., 22.33.4 when a number is expected), wrong basic relationships (e.g., "Start" of contract is after "End" of contract).

System 400 may be designed to proceed back to input step 402 if there are deficiencies or errors detected at this first triage stage. Optionally, system 400 may alert the user (e.g., solicitor 110) as to what is deficient or what the error may be that has prevented advancement of the program. In this manner, the user can concentrate on the areas of the data input that contain errors or need more information. System 400 may be designed to loop constantly until all errors are taken out or the user decides to interrupt the process. Thus, first level 404 checks basic values and its path is: forward (single option) if data entry is acceptable, and back to the solicitor if not.

After all the errors of the first level are corrected, system 400 proceeds to the second level, which is known as second phase triage validation level 406. Second level 406 of system 400 relates to the goodness or validation of the data that has been input. Stated differently, when system 400 proceeds to this second stage, the data input does not contain any obvious errors or deficiencies, and thus is now evaluated from a business perspective. In principle, in this second level, the same concept is applied as the first level with the number and the complexity of checks being greater and more sophisticated. A loop-back to the user for additional data entry could exist but is not mandatory.

In second level 406, the data is considered to fit within one of two or more mathematical models that have separate pathways. In the example shown in FIG. 4, two separate pathways or Processes A and B are shown, each with its own unique process. Depending on the quality and actual substance of the data that has been input, a given pathway is chosen to proceed.

The criteria for the selection of one path over the other is the essence of the rules. Each rule, or a combination of rules, may define a specific path. In the cases of second level 406, users (human) may apply their own decisions about the next path. In an exemplary reinsurance business implementation of the invention, these rules can be sub-categorized as plausibility, company policy, local policy, tool policy, context (data already existing in the system) implications.

The two-level triage system described in FIG. 4 is an example of a two-level business processing system according to the present invention. However, such a two-level system is not limiting of the invention. Any number of levels may be implemented to increase the efficiency and efficacy of such an automated business processing system.

Figure 5:
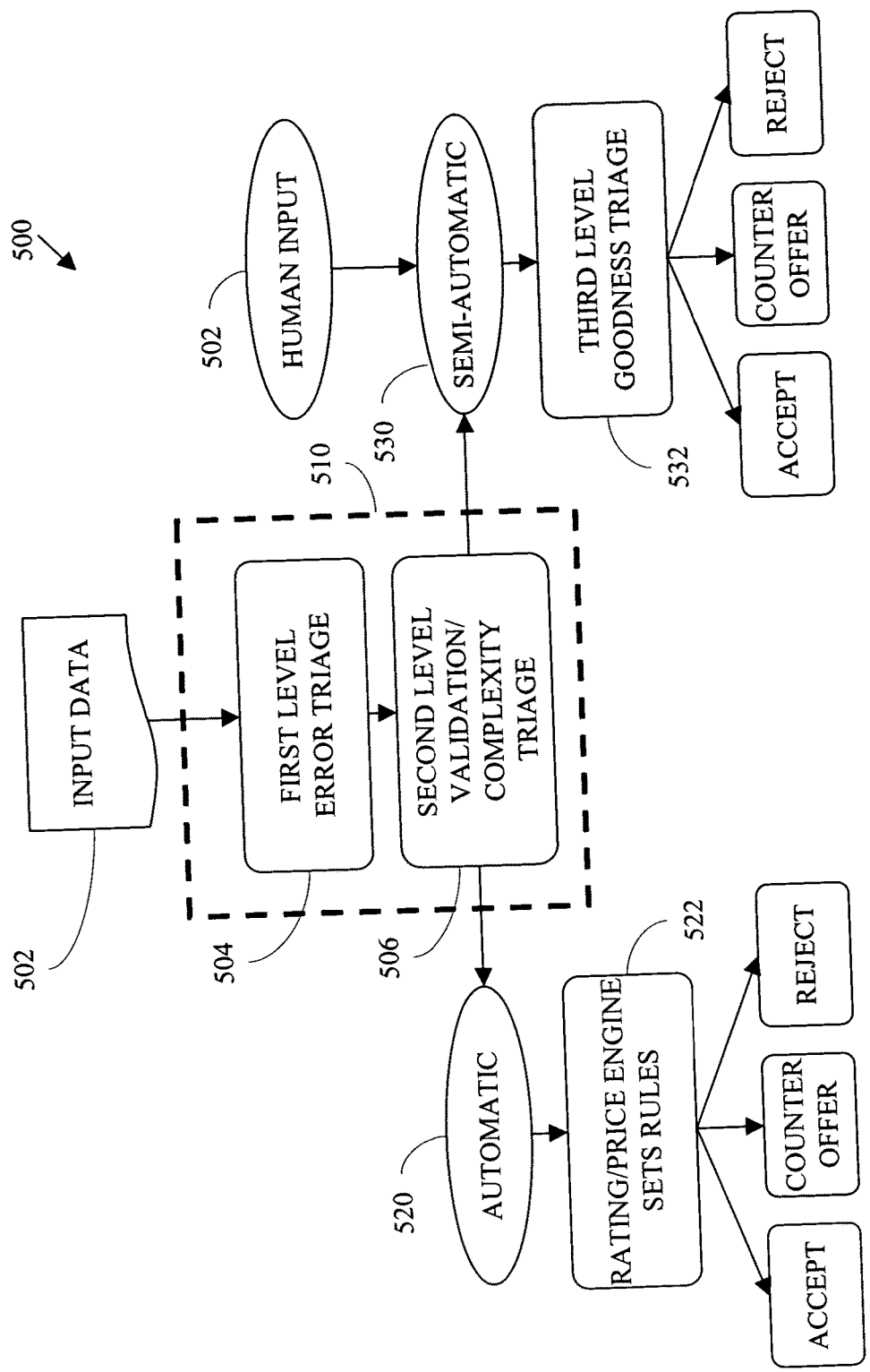
FIG. 5 shows an exemplary three-level triage system of the invention.

FIG. 5 shows an exemplary three-level triage system of the invention. Stages 502, 504, 506 of system 500 are similar in scope and function with corresponding stages 402, 404, and 406 described with respect to system 400 shown in FIG. 4. However, system 500 include added levels 522 and 532 of complexity that begins after second level 506. Here, system 500 determines which of two exemplary pathways (i.e., one of automatic pathway 520 and semi-automatic pathway 530) should be followed depending on the quality and substance of the data that was input. First pathway 520 leads to an automatic response by system 500. Such automatic response is triggered when the data that was input by the user fit within an acceptable range that is predetermined by system 500. Such ranges may be changed at any time by the business that operates such a system to account for changing business and environmental conditions.

When the data is considered as falling within the predetermined acceptable ranges of system 500 and the data as a whole fits within an acceptable mathematical formula set to be used for "automatic" responses, the cost of the contract is considered by system 500. Rating/pricing engine 522, for example, can be used to consider the input variables as compared to rules that have been pre-established by the business. Variables such as complexity, pricing and others may be considered. Rating/pricing engine 522 may accumulate hundreds or thousands of rules that are to be followed for a given set of input data.

In the case of an insurance company contacting a reinsurance company to solicit business, the cost of the contract is the premium that the insurance company must pay the reinsurance company as the cost of the coverage contract. After determining the data that was input for risk factors, and coming up with an ideal range of acceptable premiums, system 500 then compares such acceptable range of premiums with the premium that was input by the user. System 500 can propose its own premium if solicitor 110 did not provide a premium. If the input premium falls within the acceptable range, then system 500 can signify that a contract has been formed and that the deal is complete. If, however, the input premium falls outside of the range of acceptable premiums for the given set of risks as determined by the input data, or no premium data was given by the user, then system 500 can consider the business offer to have no business value for business 130, effectively rejecting the offer. Alternatively, system 500 can be configured to present a counteroffer premium to the user. Such counteroffer may be, for example, the median of the range of acceptable premiums that system 500 calculated based on the risk from the input data. Alternatively, counteroffers may be made any time the input premium is below a set acceptable value within the range of acceptable premium costs. For example, a counteroffer may always be made if the premium offer is below the median of the acceptable range. Other options are also possible.

Once system 500 determines that a premium offer is acceptable or the counteroffer is accepted by the user, then the contract is complete and system 500 terminates the program. Such automatic consideration and response by system 500 is possible when the originally input data (not including the input cost of the contract) falls within acceptable ranges preset in the system.

If, however, the originally input data (not including the cost of the contract) falls outside of the acceptable range for the input variables, system 500 may deem the data inappropriate to be considered in an automatic process. System 500 can then proceed to semi-automatic pathway 530. In semi-automatic pathway 530, third level triage 532 is encountered wherein manual intervention 502 is considered. Here, authorized personnel representing the business consider the variables that have been input by the soliciting user. Such personnel may be, for example, an underwriter or accountant or other expert. If such variables as a whole are acceptable as a whole for the business, then the personnel may signify system 500 to agree to the conditions set forth by the user. Thus, the personnel overrides system 500 in terms of accepting conditions or sets of variables that fall outside of the predetermined acceptable range of data for system 500. If, however, the personnel determines that the set of variables input by the user is unacceptable or disadvantageous for the business, the offer can then be rejected. The personnel may also change some elements in the original offer and provide a counteroffer. In one embodiment of the present invention, system 500 makes it impossible for the personnel to present a counteroffer so as to prevent misuse of system 500. Alternatively, the personnel may be authorized to present a counteroffer if the personnel determine that such a counteroffer is indicative of the risk of the proposed contract.

Although the exemplary embodiments described above have been shown with two or three levels of triage, the present invention is not limited to such levels of triage. Any number of triage may be incorporated within the present invention to increase the level of complexity and sophistication of the system.

FIGS. 6, 7, 8, 9, 10, and 11 are exemplary screenshots that can be used in the exemplary processes and systems described in FIGS. 1-5 above. Specific terminologies associated with the reinsurance business are used in screenshots 600, 700, 800, 900, 1000, and 1100 in these figures. Again, the invention is not limited to implementations and embodiments in the reinsurance business.

Screenshot 600 shown in FIG. 6 can be included as part of a user interface that can be used by a user (e.g., solicitor 110) to input data associated with a business offer. Preferably, screenshot 600 includes input fields that are configured to receive minimal requirements or basic information associated with the business offer. In exemplary screenshot 600, the input fields can be categorized or grouped to include, for example, "Business and Reinsurance Type," "General Risk Information," and "Reinsurance Details."

In each category of group of input fields, one or more of the input fields can be designated as "mandatory" input, which means the user is reminded that an input must be provided in those input fields. As shown in screenshot 600, each mandatory input field is indicated by an asterisk. Mandatory input fields can include "Name of Risk," "Original Policy/Reference Number," "Main Industry Code/Occupancy," Sub-Category," "Zip/Postal Code," "Location," 'Currency," "Inception of Reinsurance Cover," "Expiration of Reinsurance Cover," "Sum Insured," "Deductible," "Peril Covered," "MPL in % of Sum Insured," and "Num. Locations." Note that pull down menus (see, e.g., "Main Industry Code/Occupancy" input field) can be used to facilitate data input and to reduce user error.

Figure 7:
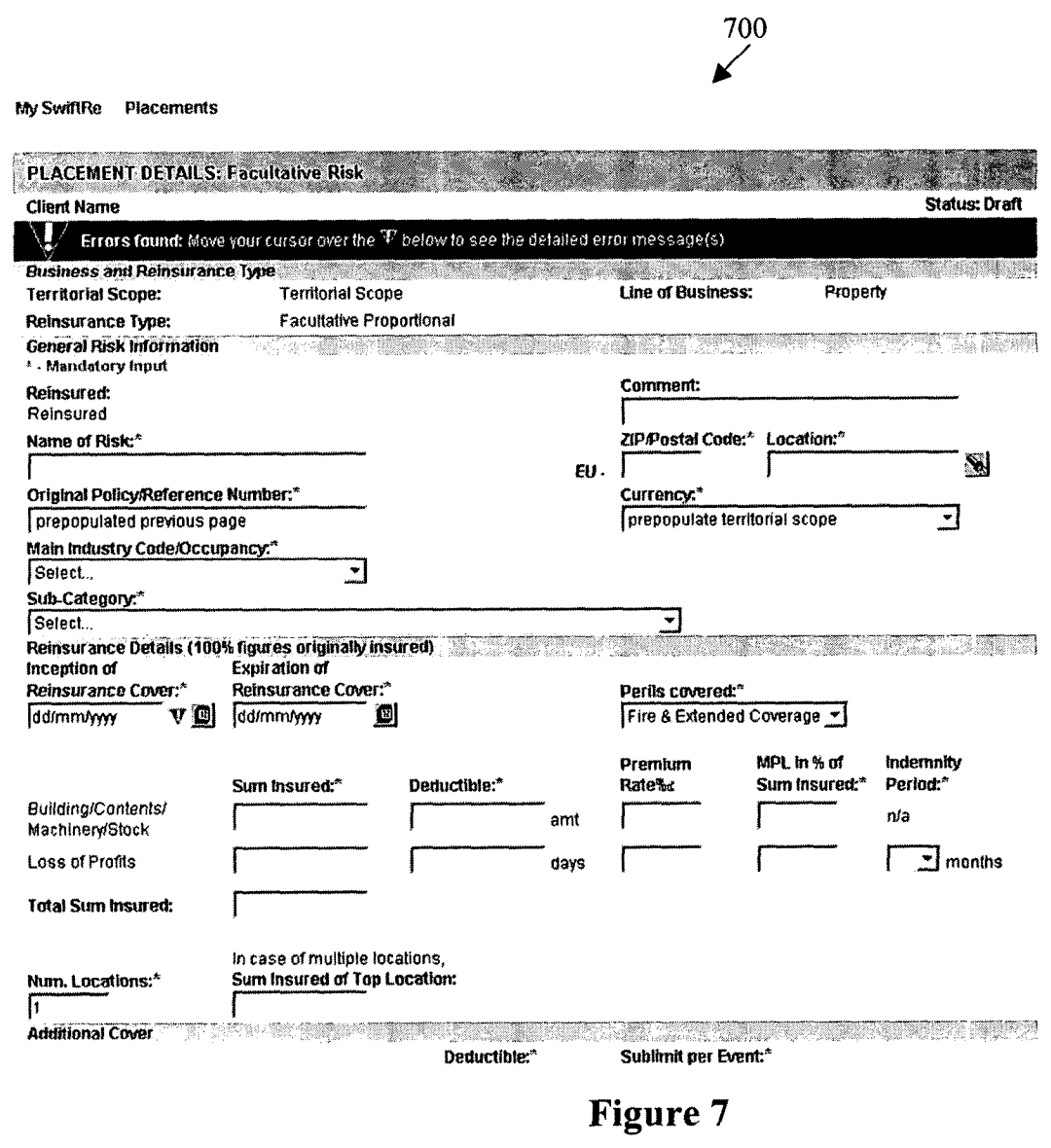

Screenshot 700 shown in FIG. 7 is an exemplary screenshot that can be displayed to solicitor 110 in the event that the input data did not pass validation or error detection as described above. Note that an "Error" indication can be included as part of screenshot 700 to alert solicitor 110 to specific input fields where the errors are found. For example, the error indication can be represented by an exclamation mark nested within an upside down triangle. As shown in screenshot 700, errors have been found in the "Inception of Reinsurance Cover" input field. The upside down triangle can be color coded, for example, the triangle can be presented on screenshot 700 with the color red.

Screenshot 800 shown in FIG. 8 is an exemplary screenshot that can be displayed to solicitor 110 in the event that the input data (basic information) has passed a first level or first phase validation, but additional or extended information may be required to pass a second level or a second phase. To the extent that any additional or extended information is required by evaluator 150, a "Warning" indication can be displayed on screenshot 800 to alert solicitor 110 to provide additional or extended information. For example, the warning indication can be represented by an exclamation mark nested within an upside up triangle. As shown in screenshot 800, additional information is requested in the "Total Sum Insured" input field. The warning indication triangle can be color coded, for example, the triangle can be presented on screenshot 800 with the color yellow. Note also that the error indication is also indicated next to an "Extended Information" button near the top of screenshot 800.

Screenshot 900 shown in FIG. 9 is an exemplary screenshot that can be displayed to solicitor 110 so that solicitor 110 can input non-standard risk information in new input fields. Solicitor 110 can arrive at screenshot 900, for example, if he pressed the "Extended Information" button shown in screenshot 800. As shown in screenshot 900, exemplary input fields associated with non-standard risk information can include "Survey Report/Risk Information," "Loss History," "Insurance Conditions/Wordings," "Reinsurance Conditions," and "Others." In addition, a "Message" field can be provided to receive additional comments from solicitor 110.

Figure 10:

Screenshot 1000 shown in FIG. 10 is an exemplary screenshot that can be displayed to solicitor 110 so that solicitor 110 can input additional or extended information in new input fields. As shown in screenshot 1000, exemplary input fields can include "Occupancy," "Deductible per Event," "Sublimit per Event," "Aggregate Deductible," "Annual Aggregate," and "Premium." Note that non-standard extended information shown in screenshot 900 of FIG. 9 can also be included in screenshot 1000 of FIG. 10 as well.

Figure 11:
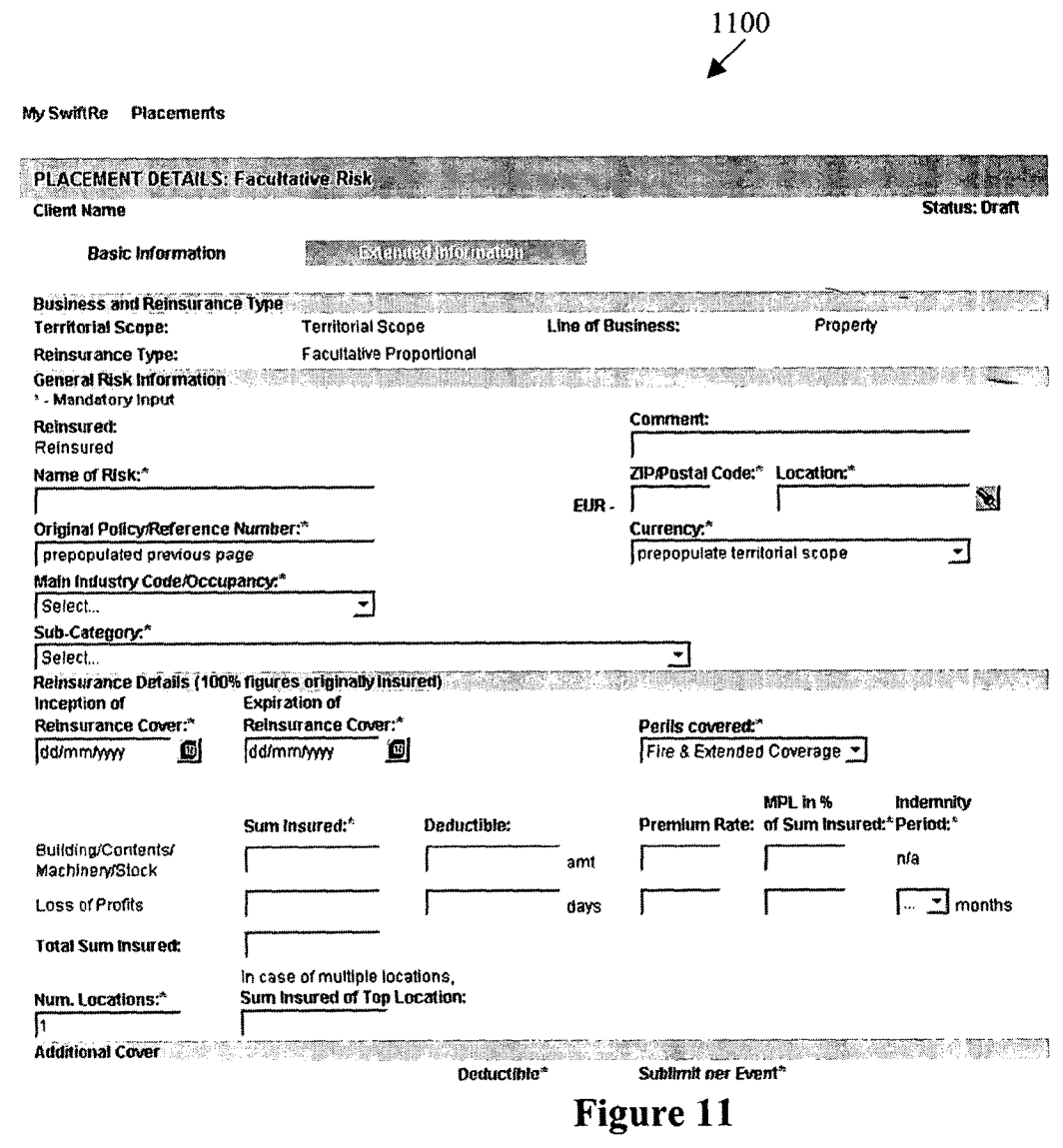

Screenshot 1100 shown in FIG. 11 indicate that the basic information and the extended information can be required from solicitor 110 in the first instance in another embodiment of the invention. Screenshot 1100 basically consolidate screenshot 600 and screenshot 1000. Solicitor 110 can toggle between screenshot 600 and screenshot 1000 by pressing one of the "Basic Information" button and the "Extended Information" button, respectively.

Figure 12:
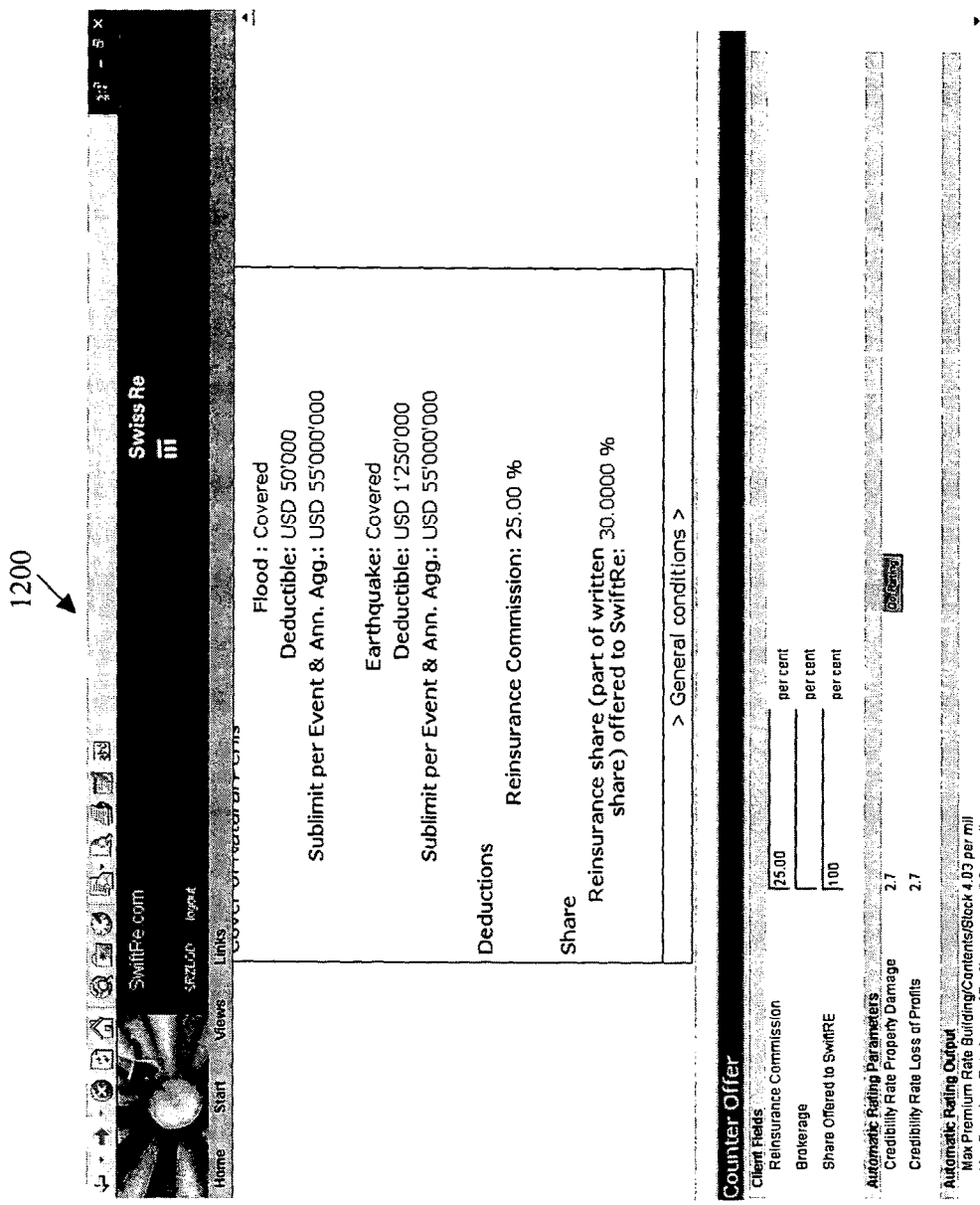
Figure 13:
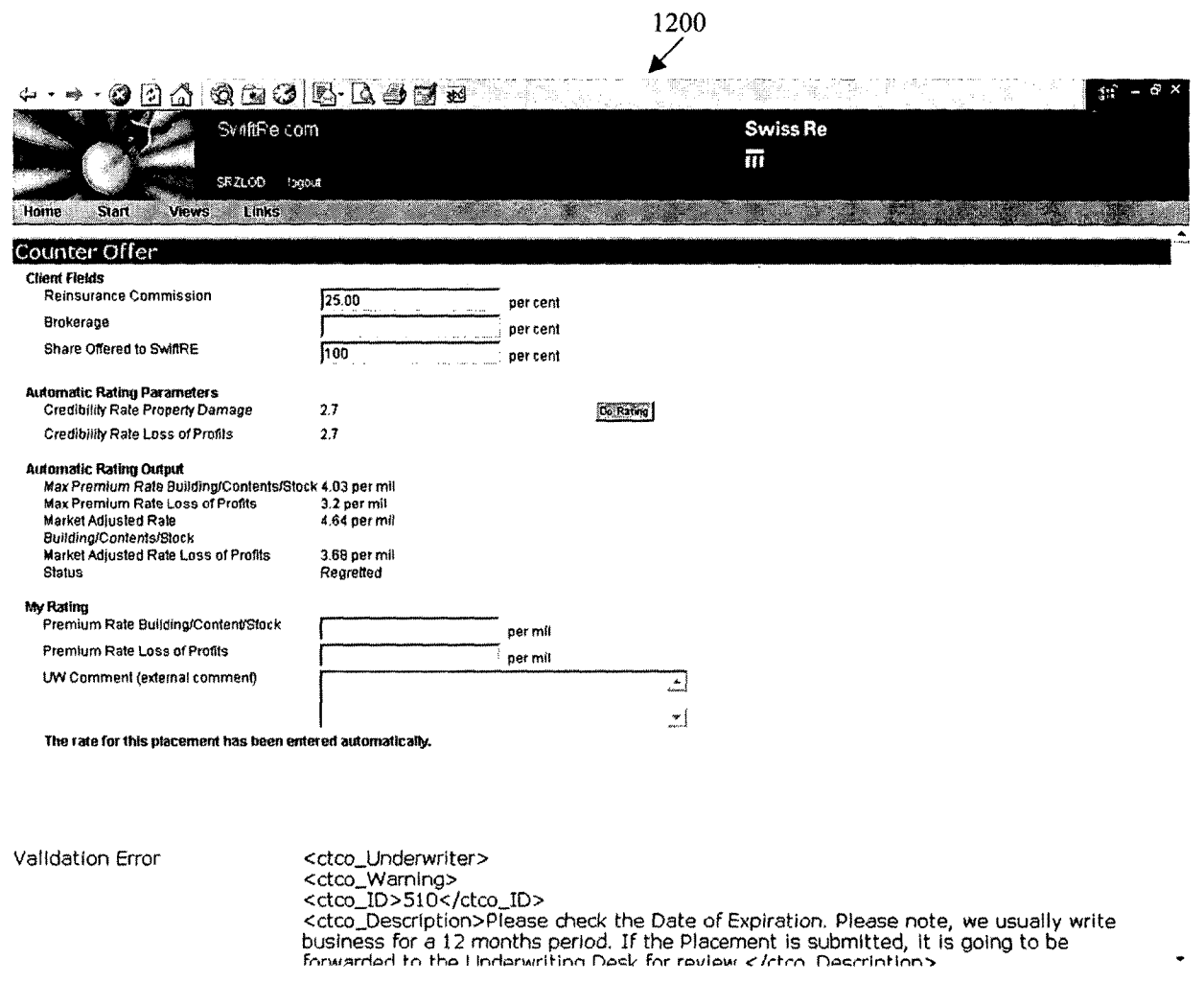

FIGS. 12 and 13 show two portions of screenshot 1200 showing an exemplary manual counteroffer that can be provided by a system of the invention. As shown in screenshot 1200, information associated with an insurance policy involved in a reinsurance offer-acceptance transaction can include type of insurance (e.g., flood, earthquake), deductible, sublimit per event and annual aggregate, and other information as shown in screenshot 1200.

The triage system and process of the invention can be used in a front office context or a back office context.

Figure 14:
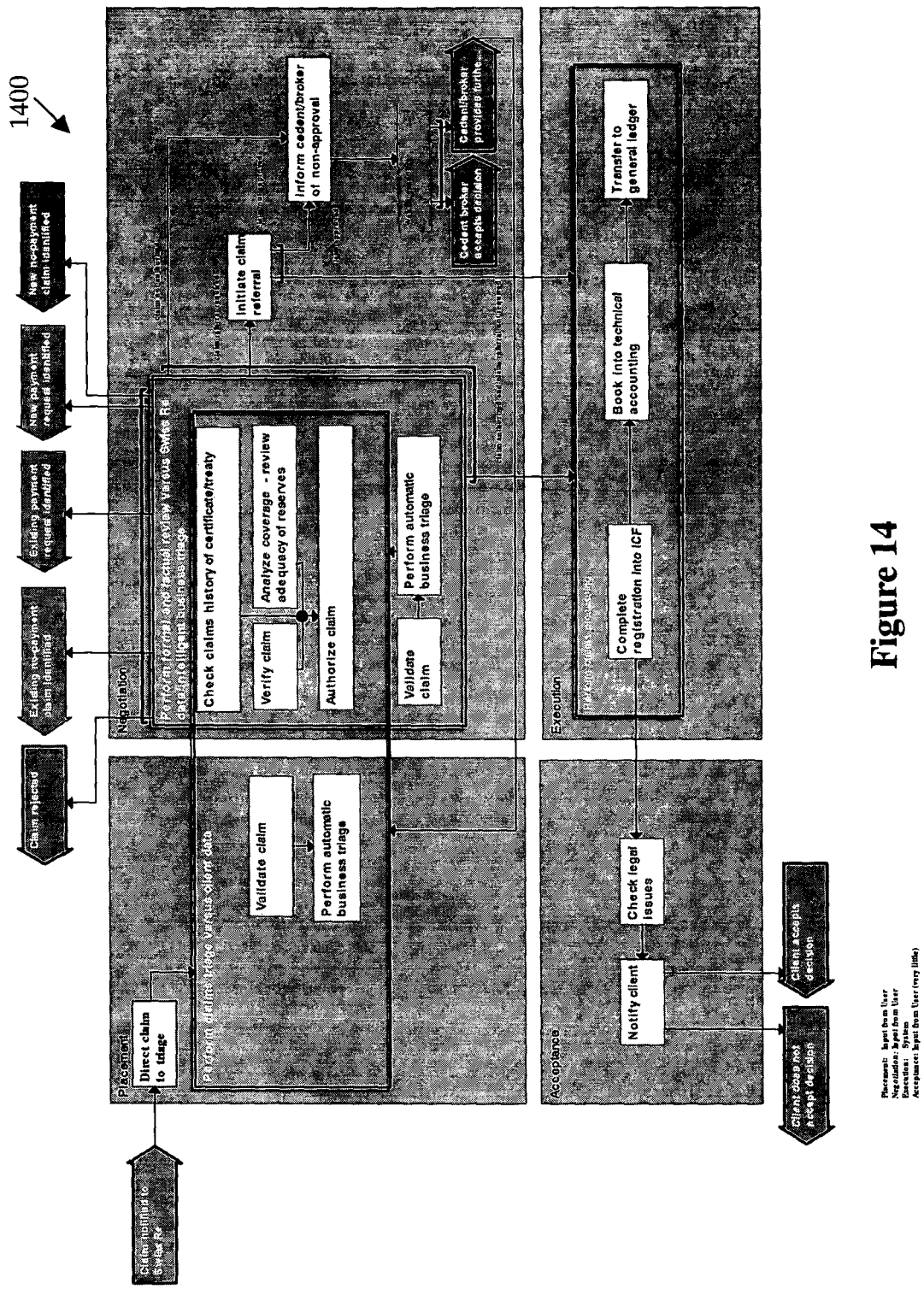
FIG. 14 shows an exemplary process through which a claim may be processed in a placement-negotiation-execution-acceptance (PNEA) model in a back office context.

In the back office context, FIG. 14 shows an exemplary process through which an insurance claim may be processed in a placement-negotiation-execution-acceptance (PNEA) model. In this context, the claim submission associated with process 1400 may be considered to be an offer made by the insurer. An approval of the claim submission may be considered to be an acceptance of the offer.

As shown in FIG. 14, when a claim is notified by a client (an exemplary solicitor 110), the claim is directed to an exemplary system of the invention in the "Placement" portion of the PNEA model. Within the Placement portion of the PNEA model (upper left quadrant), the system performs claims triage versus client data. For example, the system can perform (I) technical claim validation; (2) basic business error validation; and (3) automatic business triage. Following these three steps, the system enters into the Negotiation portion of the PNEA model (upper right quadrant) if more information is needed or further evaluation is required. Otherwise, the claim can be rejected or the process can bypass the Negotiation portion altogether and proceed directly to the Execution portion (lower right quadrant).

During the Negotiation portion, the system performs formal and factual review versus data/intelligent business triage that can be unique to the reinsurance industry. Following this formal and factual review, one or more outcomes are possible. For example, a first possible outcome involves a rejection of the claim. A second possible outcome involves the identification of an existing no-payment claim. A third possible outcome involves the identification of an existing payment request. A fourth possible outcome involves the identification of a new payment request. A fifth possible outcome involves the identification of a new no-payment claim.

During the performance of the formal and factual review, new input from the reinsurer can be validated. Then, an automatic business triage can be performed. Following the automatic business triage, claims history of certificate/treat can be checked, claim can be verified, coverage can be analyzed, and adequacy of reserves can be reviewed. In addition, a decision can be made to determine whether further processing is needed.

After the formal and factual review, if the claim is not to be further processed, the system informs a cedent/broker regarding the non-approval of the claim. The system can then wait for a response from the cedent/broker. The cedent/broker can accept the decision or provide additional information.

If a claim referral is required after the formal and factual review, the system initiates the claim referral. The system then proceeds to the Execution portion of the PNEA model.

The system can proceed directly to the Execution portion if the claim needs to be further processed but a claim referral is not required.

In the Execution portion, the system processes the claim. Here, the system can complete registration into a back office system, book into technical accounting, and/or transfer to general ledger.

Finally, in the Acceptance portion of the PNEA model (lower left quadrant), the client is notified of the final decision of the system. The client can then accept the decision or not.

Figure 15:
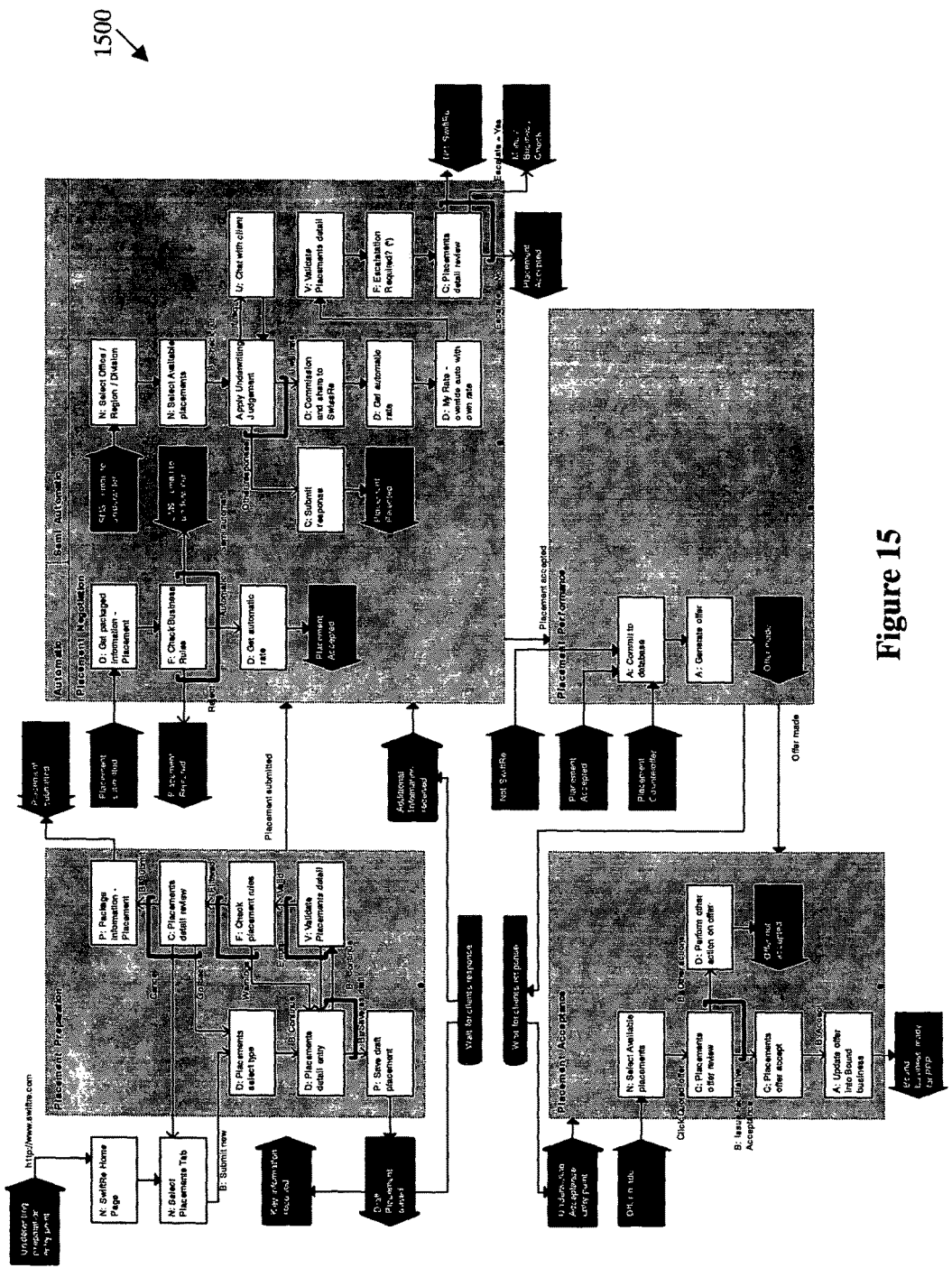
FIG. 15 shows how an exemplary triage process of the invention may be incorporated in a reinsurance business transaction in the PNEA model in a front office context.

In the front office context, FIG. 15 shows how an exemplary triage process of the invention may be incorporated in the processes associated with a reinsurance business transaction in the PNEA model. Placement workflow 1500, as shown in FIG. 15, includes numerous processes. Some of these processes can incorporate the triage process of the invention.

In the Placement Preparation quadrant, exemplary processes include "D: Placements select type," "D: Placements detail entry," "P: Save draft placement," "P: Package information-Placement," "C: Placements detail review," "F: Check placement rules," and "V: Validate Placements detail." Of these, at least processes "F: Check placement rules" and "V: Validate Placements detail" can include at least one aspect of the triage process of the invention as described above.

In the Placement Negotiation quadrant, exemplary processes include "D: Get packaged information-Placement," "F: Check Business Rules," "D: Get automatic rate," "C: Submit response," "N: Select Office/Region/Division," "N: Select Available placements," "Applying Underwriting Judgement," "D: Commission and share to SwissRe," "D: Get automatic rate," "D: My Rate (override auto with own rate)," "U: Chat with client," "V: Validate Placements detail," "F: Escalation Required?(*)," and "C: Placements detail review." Of these, at least process "Applying Underwriting Judgement," "V: Validate Placements detail," and "F: Escalation Required?(*)" can include at least one aspect of the triage process of the invention as described above.

In the Placement Performance quadrant, exemplary processes include "A: Commit to database" and "A: Generate offer." In the Placement Acceptance quadrant, exemplary processes include "N: Select Available placements," "C: Placements offer review," "C: Placements offer accept," "A: Update offer into Bound business," and "D: Perform other action on offer." One or more of these processes may incorporate an aspect of the triage process of the invention.

The systems and methods of the present invention are designed to be user-friendly and readily accessible to a customer with minimal manual intervention by a business utilizing such systems and/or methods. Thus, a non-limiting means of providing access to the systems and/or methods of the present invention is through the Internet. A solicitor may readily access the business triage process through the Internet at any time and from any place in the world that allows Internet access. Such access may either be provided through hardwire means or remotely. This increased flexibility and lack of restraint with respect to time and place to provide a tremendous benefit to the user. Likewise, such flexibility offered to the user provides the business with increased partner base who are attracted to such flexibility.

Systems and processes according to the present invention also automate accounting processes that have typically required time-consuming and inefficient manual handling. Further, they also improve efficiencies in other transaction areas. Such other areas include, but are not limited to, data exchange between customer and company (e.g., reinsurer), validation and plausibility checks, confirmation about the status of a transaction and changes of status. Other areas may also receive benefits from the current invention.

The exemplary systems and methods described above according to the present invention have many advantages. One such advantage is that the interaction between the offeror and the business is automated. This automation reduces the costs and errors associated with non-automated processes, such as, for example, person-to-person communications. Furthermore, all transactions are electronically recorded, thus, reducing the potential for miscommunication between live parties. Also, the ability to always merge back to the basic flow creates better structured and cheaper systems.

Another unique advantage of the systems and methods according to the present invention is their ability for rapid expansion. Although the present invention is presented with very specific examples of procedures that are most commonly encountered in the reinsurance business, the invention is not restricted to this type of business. Any business that could benefit from automating transactional encounters between the business and its potential business partners would benefit from the use of this invention. The parameters, options and paths shown in the exemplary embodiments of the figures could be programmed to account for the specific requirements and unique business options of any other business.

Another advantage associated with the triage process of the invention is that structured information can be used for businesses to build front and back office systems. Systems that are built using the triage process of the invention are easier to be developed. Furthermore, these systems, once built and developed, are easier to maintain.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. An automated, modular system for automatically and dynamically adaptable transacting of offers based on a fully automated multi-pass validation process to improve accuracy, efficiency, and speed of the automated transacting, the system comprising:

a display configured to display a user interface on a remote computer of an insurance business;

a server used by a reinsurance business and accessible by the insurance business; and contract evaluation circuitry, standard processing circuitry, and non-standard processing circuitry, the contract evaluation circuitry, the standard processing circuitry, and the non-standard processing circuitry included in the server, wherein the standard processing circuitry is configured to process data by an automatic process, and the non-standard processing circuitry is configured to process data with human intervention by an additional data input, the contract evaluation circuitry is configured (i) to receive input data of a reinsurance event from the insurance business, (ii) to determine in a fully automated first triage-pass whether the input data is complete and error free in accordance with error validation criteria by determining whether required data is omitted, the input data is in the wrong format, and the input data contains improper relationships, (iii) to process the input data by applying at least one plausibility rule, at least one global and local rule, and at least one application rule, and (iv) to evaluate in a second triage-pass whether the complete input data has to be further processed in a third triage-pass by the standard processing circuitry or the non-standard processing circuitry, the server is configured to transmit an alert over a network to the remote computer associated with the insurance business when the contract evaluation circuitry determines that the input data includes one or more errors, the alert causes the user interface to display the alert on the remote computer at specific locations on the user interface that require a user's attention, and enables the remote computer to communicate with the server via the network, the specific locations being based on the determined one or more errors, the complete input data is sent for further processing to the standard processing circuitry in a case where the contract evaluation circuitry determines that the complete input data fits a predetermined acceptable range, the predetermined acceptable range being an ideal range of acceptable premiums, and where the complete input data includes at least a premium from the insurance business, the complete input data is sent for further processing to the non-standard processing circuitry in a case where the contract evaluation circuitry determines that the complete input data falls outside of the predetermined acceptable range depending on a quality and substance of the data that was input, and where the complete input data requires the human intervention by overriding terms of accepting conditions or sets of variables that fall outside of the predetermined acceptable range, after the contract evaluation circuitry has determined whether a rating engine for third party liability is not advanced enough to allow automatic rating of the reinsurance event, the automatic process included in the standard processing circuitry is permitted to perform the automatic rating of the reinsurance event, and the automatic process applies, based on a location at which the reinsurance event occurs and in response to determining that a total sum insured of the reinsurance event exceeds a threshold, the global and local rule, the global and local rule specifying that a secondary approval process must occur, wherein the whole triage-processes are nested enabled to trigger new triage pattern at any step along the process providing a new nested multi-pass triage process, the ranges being changeable at any time during operation of the system by accounting for changing business or environmental conditions, and wherein the local rule specifying that a secondary approval process must occur, is triggered only based on the total sum insured exceeding the threshold and a location at which the reinsurance event occurs.

2. The system of claim 1, wherein said contract evaluation circuitry determines that the input data is not complete, then the insurance business is alerted to complete the input data.

3. The system of claim 1, wherein the standard processing circuitry or the non-standard processing circuitry are configured to operate with a prerequisite of a given range of variables.

4. The system of claim 1, wherein the standard processing circuitry and the non-standard processing circuitry are configured to accept the complete input data of the insurance business and are configured to inform the insurance business that a contract has been formed based on the complete input data.

5. The system of claim 1, wherein the standard processing circuitry and the non-standard processing circuitry are configured to inform the insurance business with a counteroffer.

6. The system of claim 1, wherein the standard processing circuitry and the non-standard processing circuitry are configured to inform the insurance business that a contract cannot be formed.

7. The system of claim 1, wherein the at least one global and local rule that is only associated with a reinsurance business model is a rule specifying that petro-chemical placements are subject to a special evaluation.

8. The system of claim 1, wherein the threshold is 300 million Swiss francs and the location is in Germany.

9. The system of claim 1, wherein the at least one global and local rule that is only associated with a reinsurance business model includes determining whether the insurance business has submitted more than a predetermined number of insurance claims and needs to be audited.

10. The system of claim 1, wherein the plausibility rule relates to expected premium payments and the application rule relates to whether the rating engine for the third party liability is advanced enough to enable the automatic rating.

11. An automated, modular method for automatically and dynamically adaptable transacting of offers based on a fully automated multi-pass validation process to improve accuracy, efficiency, and speed of the automated transacting, the method performed on a server that includes at least one hardware processor, the method comprising the steps of:

receiving input data of a reinsurance event from an insurance business at contract evaluation circuitry implemented on the server, evaluating the input data of the reinsurance event to determine by the contract evaluation circuitry in a fully automated first triage-pass whether the input data is complete and error free in accordance with error validation criteria by determining whether required data is omitted, the input data is in the wrong format, and the input data contains improper relationships, transmitting an alert over a network to a remote computer associated with the insurance business when the contract evaluation circuitry determines that the input data includes one or more errors, the alert causing a user interface installed on the remote computer of the insurance business to display the alert on the remote computer at specific locations on the user interface that require a user's attention, and enabling the remote computer to communicate with the server via the network, the specific locations being based on the determined one or more errors, processing the input data by applying at least one plausibility rule, at least one global and local rule, and at least one application rule, determining by the contract evaluation circuitry in a second triage-pass whether the complete input data has to be further processed in a third triage-pass by a standard processing circuitry having an automatic process or a non-standard processing circuitry implemented on the server, sending the complete input data for further processing to the standard processing circuitry in a case where the contract evaluation circuitry determines that the complete input data fits a predetermined acceptable range, the predetermined acceptable range being an ideal range of acceptable premiums, and where the complete input data includes at least a premium from the insurance business, verifying whether a rating engine for third party liability is not advanced enough to allow automatic rating of the reinsurance event by the automatic process of the standard processing circuitry, applying, based on a location at which the reinsurance event occurs and in response to determining that a total sum insured of the reinsurance event exceeds a threshold, the global and local rule, the global and local rule specifying that a secondary approval process must occur, and sending the complete input data for further processing to the non-standard processing circuitry in a case where the contract evaluation circuitry determines that the complete input data falls outside of the predetermined acceptable range depending on a quality and substance of the data that was input, and where the complete input data requires human intervention by overriding terms of accepting conditions or sets of variables that fall outside of the predetermined acceptable range of data, wherein the whole triage-processes are nested enabled to trigger new triage pattern at any step along the process providing a new nested multi-pass triage process, the ranges being changeable at any time during operation of the system by accounting for changing business or environmental conditions, and wherein the local rule specifying that a secondary approval process must occur, is triggered only based on the total sum insured exceeding the threshold and a location at which the reinsurance event occurs.

12. The method of claim 11, wherein in said step of evaluating the input data, in a case where the input data is not complete, the insurance business is alerted to complete the input data.

13. The method of claim 11, wherein the standard processing circuitry and the non-standard processing circuitry are configured to operate with a prerequisite of a given range of variables.

14. An automated, modular computerized device configured to perform automatically and dynamically adaptable transacting of offers based on a fully automated multi-pass validation process to improve accuracy, efficiency, and speed of the automated transacting, the device comprising:

a server configured to be accessed by an insurance business, the server including contract evaluation circuitry, standard processing circuitry, and non-standard processing circuitry, wherein the standard processing circuitry is configured to process data by an automatic process, and the non-standard processing circuitry is configured to process data with human intervention by an additional data input the contract evaluation circuitry is configured (i) to receive input data for a reinsurance event from the insurance business, (ii) to determine in a fully automated first triage-pass whether the input data is complete and error free in accordance with error validation criteria by determining whether required data is omitted, the input data is in the wrong format, and the input data contains improper relationships, (iii) to process the input data by applying at least one plausibility rule, at least one global and local rule, and at least one application rule, and (iv) to evaluate in a second triage-pass whether the complete input data has to be further processed in a third triage-pass by the standard processing circuitry or the non-standard processing unit circuitry, the server is configured to transmit an alert over a network to a remote computer associated with the insurance business when the contract evaluation circuitry determines that the input data includes one or more errors, the alert causes a user interface installed on the remote computer of the insurance business to display the alert on the remote computer at specific locations on the user interface that require a user's attention, and enables the remote computer to communicate with the server via the network, the specific locations being based on the determined one or more errors, the complete input data is sent for further processing to the standard processing circuitry in a case where the contract evaluation circuitry determines that the complete input data fits a predetermined acceptable range, the predetermined acceptable range being an ideal range of acceptable premiums, and where the complete input data includes at least a premium from the insurance business, the complete input data is sent for further processing to the non-standard processing circuitry in a case where the contract evaluation circuitry determines that the complete input data falls outside of the predetermined acceptable range depending on a quality and substance of the data that was input, and where the complete input data requires the human intervention by overriding terms of accepting conditions or sets of variables that fall outside of the predetermined acceptable range of data, after the contract evaluation circuitry has determined whether a rating engine for third party liability is not advanced enough to allow automatic rating of the reinsurance event, the automatic process included in the standard processing circuitry is permitted to perform the automatic rating of the reinsurance event, and the automatic process applies, based on a location at which the reinsurance event occurs and in response to determining that a total sum insured of the reinsurance event exceeds a threshold, the global and local rule, the global and local rule specifying that a secondary approval process must occur, wherein the whole triage-processes are nested enabled to trigger new triage pattern at any step along the process providing a new nested multi-pass triage process, the ranges being changeable at any time during operation of the system by accounting for changing business or environmental conditions, and wherein the local rule specifying that a secondary approval process must occur, is triggered only based on the total sum insured exceeding the threshold and a location at which the reinsurance event occurs.

15. The computerized device of claim 14, wherein said contract evaluation circuitry determines that the input data is not complete, then the insurance business is alerted to complete the input data.

16. The computerized device of claim 14, wherein the standard processing circuitry or the non-standard processing circuitry are configured to operate with a prerequisite of a given range of variables.

17. The computerized device of claim 14, wherein the standard processing circuitry and the non-standard processing circuitry are configured to accept the complete input data of the insurance business and are configured to inform the insurance business that a contract has been formed based on the complete input data.

18. The computerized device of claim 14, wherein the standard processing circuitry and the non-standard processing circuitry are configured to inform the insurance business with a counteroffer.

* * * * *